United States Patent
Macaluso et al.

(10) Patent No.: US 7,422,545 B2
(45) Date of Patent: Sep. 9, 2008

(54) ALL-TERRAIN VEHICLE REVERSE GEAR PROTECTION

(75) Inventors: Anthony Macaluso, Thief River Falls, MN (US); Ole E. Tweet, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 348 days.

(21) Appl. No.: 11/119,410

(22) Filed: Apr. 28, 2005

(65) Prior Publication Data

US 2007/0221433 A1      Sep. 27, 2007

(51) Int. Cl.
*B60W 10/04* (2006.01)
(52) U.S. Cl. ............... 477/110; 477/107; 477/111; 180/223; 180/247
(58) Field of Classification Search .......... None
See application file for complete search history.

(56) References Cited

U.S. PATENT DOCUMENTS

| | | | |
|---|---|---|---|
| 4,073,203 A * | 2/1978 | Wurst et al. | 477/129 |
| 4,505,169 A * | 3/1985 | Ganoung | 477/100 |
| 4,620,453 A | 11/1986 | Kumazawa | |
| 4,658,661 A | 4/1987 | Terashita | |
| 4,735,105 A | 4/1988 | Kumazawa | |
| 5,351,779 A * | 10/1994 | Yamashita | 180/197 |
| 5,819,585 A * | 10/1998 | Darnell | 74/335 |
| 6,480,771 B2 * | 11/2002 | Nishida et al. | 701/34 |
| 6,726,596 B2 * | 4/2004 | Kresse et al. | 477/116 |

* cited by examiner

*Primary Examiner*—David D. Le
(74) *Attorney, Agent, or Firm*—Black Lowe & Graham, PLLC

(57) ABSTRACT

A reverse system for an all-terrain vehicle (ATV) having an engine and an engine drive shaft, a reverse activator, an engine speed limiter, and an override switch. The reverse activator is coupled to the drive shaft. The reverse activator activates operation of the ATV in a reverse direction. The engine speed limiter limits engine speed to below a predetermined level while the reverse activation switch is engaged. The override switch allows engine speeds above the predetermined level only when the transmission is in four-wheel-drive. The method of carrying out the invention is also disclosed.

17 Claims, 5 Drawing Sheets

ALL-TERRAIN VEHICLE REVERSE GEAR PROTECTION

FIELD OF THE INVENTION

This invention relates generally to all-terrain vehicle transmission and four-wheel-drive systems and, more specifically, to switches for limiting destructive loads during reverse operation.

BACKGROUND OF THE INVENTION

As a safety precaution, all-terrain vehicle (ATV) transmissions often include an engine speed limiter for reverse and neutral operation. Some of these "rev limiters" function by controlling ignition timing and spark upon reaching a predetermined engine speed or number of revolutions per minute (rpm). For example, if the ATV is in reverse and 4500 rpm are reached, the rev limiter will cut the engine ignition timing to maintain the speed at or below the predetermined set point of 4500 rpm. Rev limiter override switches have also been added so the user can switch off the rev limiter in situations where more power in reverse is needed. Such situations may include when the ATV is stuck or when backing up a steep ramp into a vehicle.

However, with more powerful ATV engines being used a problem occurs that the through-engine drive shaft flexes under heavy reverse rotation loads as the right angle helical cut gear transfers power from the engine transmission. The driven gear tends to climb the drive gear that is secured to the drive shaft as the shaft flexes. This causes the teeth to misalign and break. Another situation occurs when the ATV moves from a slippery surface where the wheels are spinning to a higher traction surface where the wheels stop spinning as freely and the load suddenly increases. This can also cause gear teeth misalignment and breakage within the engine.

A more robust gear system, less susceptible to breakage is needed for high torque engines. Such a system should not add excessive weight or cost to the engine.

SUMMARY OF THE INVENTION

The present invention overcomes the disadvantages of the prior art reverse systems with a reverse system for an all-terrain vehicle (ATV) having an engine and an engine drive shaft. The system includes a reverse actuator, an engine speed limiter, an override switch and a two/four-wheel-drive selector. The reverse activator is coupled to the drive shaft to activate operation of the ATV in a reverse direction. The engine speed limiter limits the engine speed to below a predetermined level while the reverse activation switch is activated. The override switch allows engine speeds above the predetermined level. However, the override switch is so connected that it activates only when the transmission is in four-wheel-drive mode.

In a preferred embodiment, the system further includes a driven gear coupled to the drive shaft and a drive gear coupled to the transmission and crankshaft. The drive gear includes a right-angle helically cut gear. The drive shaft extends forward of the drive gear to drive the front wheels and rearward of the drive gear to drive the rear wheels. In this embodiment, a drive selector and a front drive, which may include a front differential, are provided. The drive selector is coupled to the drive shaft and includes a manual lever or an electric motor used to engage the drive shaft with the front differential.

Preferably, the system further includes a four-wheel-drive switch to switch between two- and four-wheel-drive or indicate four-wheel-drive is selected (with manual selector) and an engine speed controller. When the override switch is activated, the position of the four-wheel-drive switch determines which setting is activated within the engine speed controller. The engine speed controller includes a first lower speed limit and a second higher speed limit. The first speed limit is activated in reverse-wheel-drive mode when the ATV is in two-wheel-drive.

In an alternate embodiment of the invention, when the transmission is in reverse the override switch also switches the ATV into four-wheel-drive mode.

The reverse speed limiter override circuit for the four-wheel-drive vehicle preferably includes a power source, a two-/four-wheel-drive switch, (or indicator switch) a reverse switch, an override switch, and an engine speed limiter. The two- to four-wheel-drive switch (or indicator switch) is coupled to the power source. The override switch is coupled to the reverse switch and the two-to-four-wheel-drive switch. The engine speed limiter is coupled to the two-to-four-wheel-drive switch and to the override switch. With the override switch in the first position, reverse operation engine speed is limited to a first level. With the switch in a second position, reverse operation engine speed is allowed above the first level, but only with four-wheel-drive engaged. The activated override switch sends an electric signal through the drive switch. The drive switch is coupled to the speed limiter such that the two-wheel-drive position of the switch sends the override signal to the first level limit. The four-wheel-drive position sends the signal to a higher level limit.

The method for reverse operation of the vehicle is also set forth. The method includes engaging a reverse activator and limiting engine speed below a predetermined level in normal reverse operation. An override switch is engaged to attempt reverse operation with engine speeds above the predetermined level. The override switch only allows higher engine speeds above the predetermined level after determining whether four-wheel-drive is engaged.

In one preferred alternate embodiment, the engagement of the override switch also ensures engagement of four-wheel-drive mode. If prior to activation of the override switch the four-wheel-drive is not engaged, activation of the override switch also operates the electric motor to switch to four-wheel-drive.

The activated position of the override switch sends an electrical signal through a two-wheel/four-wheel-drive selector or indicator switch. The two-wheel-drive switch position sends the override signal to a controller to maintain a non-override engine speed condition.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

The present invention provides a more robust system for high-power reverse operation of an ATV. The system is employed without addition of expensive gearing, heavier shafts, or engine restructuring with additional bearings. The system relies upon switching into four-wheel-drive for certain reverse operating conditions to balance the load on the drive shaft of the engine to protect the bevel gears of the engine from misalignment and breakage in high-load reverse situations.

Figure 1:
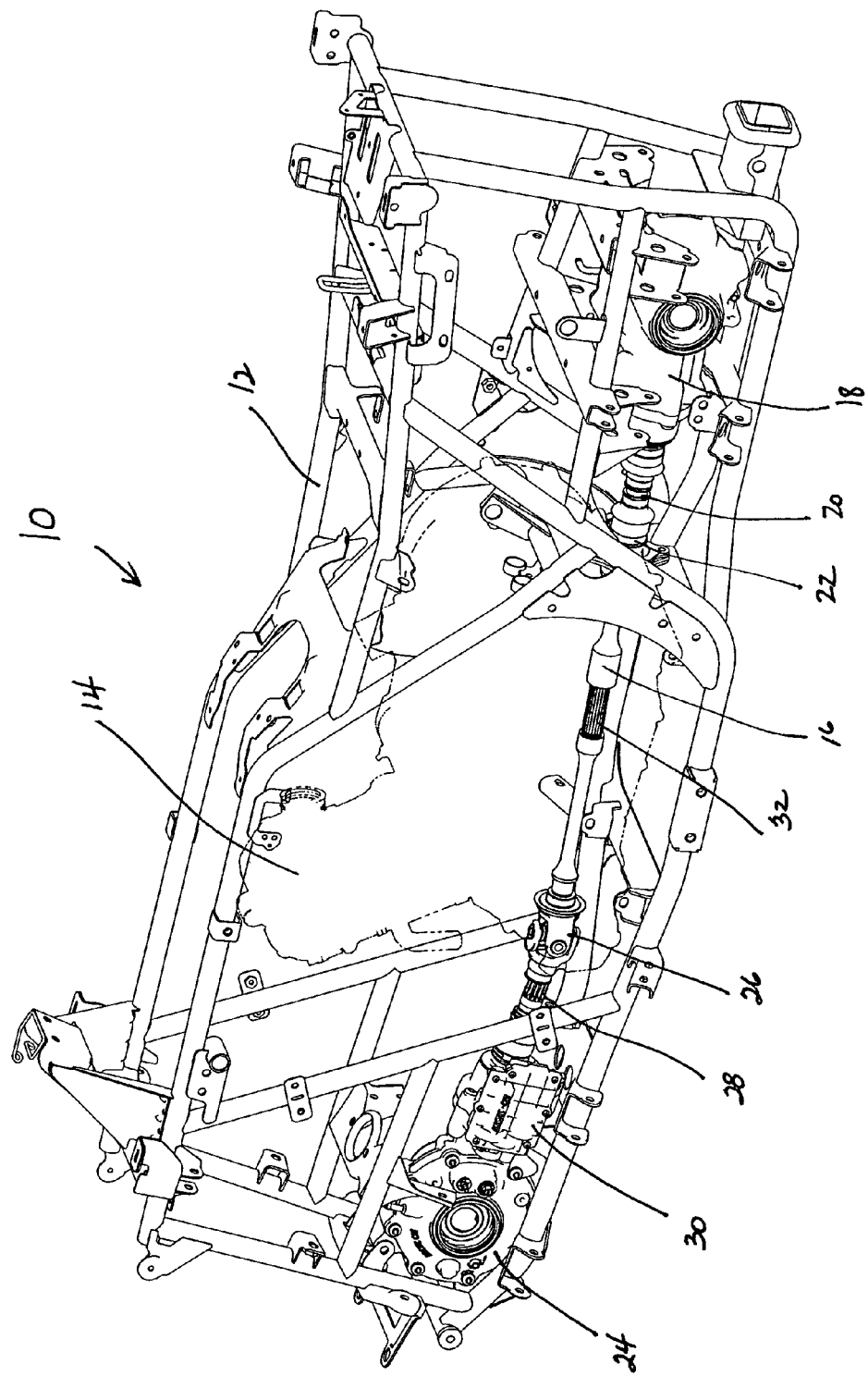
FIG. 1 is an isometric view of an ATV frame with certain components attached thereto.

FIG. 1 illustrates a typical ATV frame with the drive system shown mounted thereto. All-terrain vehicle (ATV) 10, includes a frame 12 with an engine 14 mounted in a mid-section thereof. Note that engine 14 in FIG. 1 is shown in phantom view such that the drive elements may be better illustrated.

A through-engine shaft 16 is provided within engine 14. Engine shaft 16 is driven by an entrainment of gears extending from the engine crankshaft (not shown). Engine shaft 16 is engaged with the gears at longitudinal splines 32. Engine shaft 16 is coupled to a rear drive 18, which may include a rear differential, secured to the rear end of frame 12. The rear drive axle and wheels (not shown) are secured to rear drive 18 for propelling the vehicle. Rear drive 18 is coupled to engine shaft 16 with rear drive shaft 20 and rear coupler 22 in a standard manner.

As ATV 10 is a four-wheel-drive vehicle, a front drive 24, which may include a differential, is also secured at the forward end of frame 12. Front drive 24 is interconnected with engine shaft 16 through a front universal joint 26 coupled at the front end of engine shaft 16. A front drive shaft 28 extends from front universal joint 26 to a front gear case 30. Front gear case 30 may include an electric motor for switching ATV 10 from a 4×2 drive arrangement to 4×4 drive arrangement where both the rear and front differentials are engaged to propel ATV 10. In another embodiment, a manual actuator is provided with a position indicator switch. Front gear case 30 interconnects with front drive 24 between front drive shaft 28 and front drive 24. The electric motor within front gear case 30 is interconnected to the wiring system of ATV 10 as will be described in somewhat more detail below.

Figure 2:
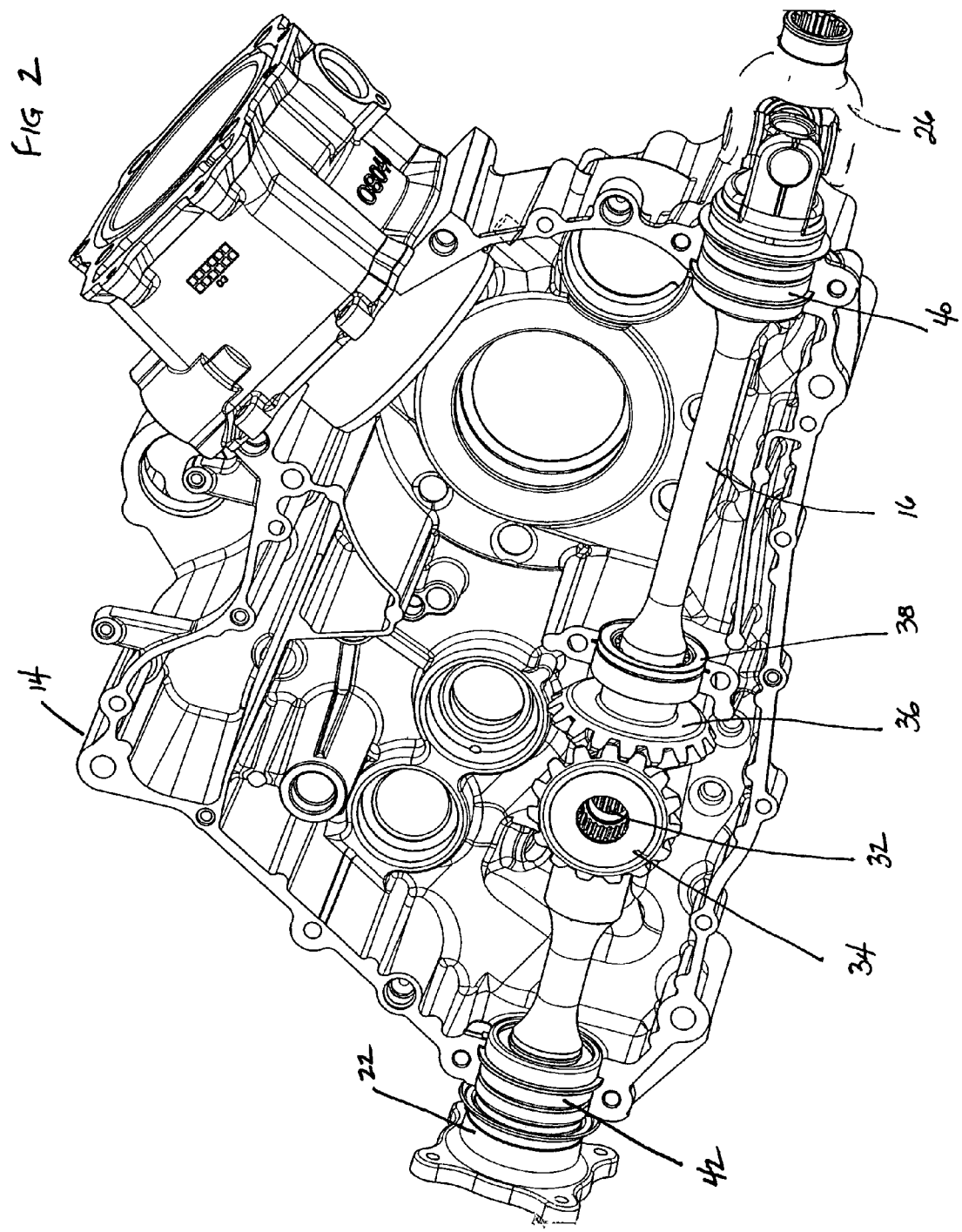
FIG. 2 is an isometric view of one side of an engine casing with certain drive components held therein.

Turning now to FIG. 2, the interconnection details of engine shaft 16 within engine 14 as well as the bevel gears coupled to the engine shaft 16 will now be discussed. As seen in both FIGS. 1 and 2, through engine shaft 16 includes longitudinal splines 32 formed in a mid-section thereof. A driven gear 36 engages splines 32. Driven gear 36 is a right-angle helically cut gear. Driven gear 36 is entrained with a drive gear 34 situated at a right angle to driven gear 36. Drive gear 34 includes internal teeth also for engagement with a shaft to interconnect with the remaining drive train (transmission) within the gear case of engine 14. Drive gear 34 is thus interconnected to the crankshaft (not shown) of engine 14 for driving engine shaft 16 to propel ATV 10.

The two right-angle helically cut gears 34 and 36 tend to separate slightly or misalign from one another during reverse operation during heavy loads. This causes the gears to misalign and ultimately break, causing a failure of the system. Such breakage tends to happen during reverse operation under extremely heavy loads with high horsepower engines. Such loads are somewhat restricted by having a rev limiter to keep the engine speed below a certain predetermined level when the engine is in reverse operation. During high load situations in reverse, the engine shaft 16 tends to deflect as the bevel gears push away from each other causing slight misalignment. Such bending occurs primarily when the vehicle is only in two-wheel-drive reverse operation. During four-wheel-drive reverse operation, both ends of engine shaft 16 are under load and tend to balance out the bending forces such that minimal deflection occurs and gears 34 and 36 are not damaged.

The engine shaft bearing locations also affect shaft deflection. A mid engine bearing 38 is positioned just forward of driven gear 36 and mounted within engine 14. A forward bearing 40 is positioned at the forward end of engine 14 where engine shaft 16 exits engine 14 for coupling with front universal-joint 26. An aft bearing 42 is positioned at the rear end of engine 14 where engine shaft 16 interfaces with rear coupler 22. Thus, there are significant spans within engine 14 unsupported by bearings such that engine shaft 16 may more easily bend, especially when unbalanced loads are placed thereon. Thus, if no load is on the front end of engine shaft 16 due to disengagements of front gear case 30, such that the front wheels are free-wheeling, the major load is placed on the rear portion of engine shaft 16. This unbalanced situation tends to cause more misalignment issues between gears 34 and 36 when in reverse operation, as discussed.

Several solutions may be possible including the provision for more bearings within engine 14. However, this may be an expensive solution and increases the cost of ATV 10 as well as the complexity of engine 14. The problem is less expensively solved by ensuring that ATV 10 is engaged in four-wheel-drive before any reverse revolution override is engaged. This tends to balance the loads on shaft 16 such that no damage to gears 34 and 36 occurs under high loads.

Figure 3:
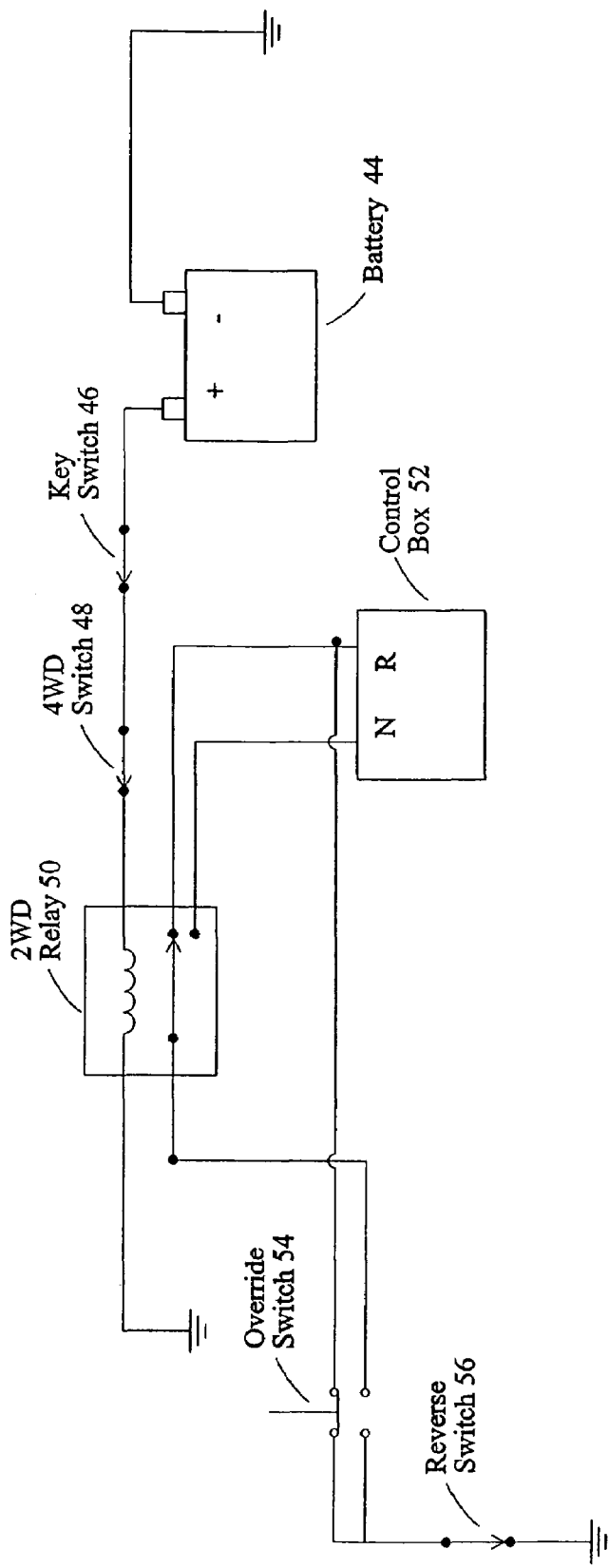
FIG. 3 is an electrical schematic view of reverse override and four-wheel-drive switching.

FIG. 3 illustrates a schematic diagram of the reverse override power flow system without the other connections for the electrical system being shown. This simplified schematic helps to understand the switching operations that are accomplished to allow higher engine speeds and loads during reverse operation situations in which additional power and/or traction are desired. Under normal reverse operation, the speed of the engine is limited to 4500 rpm. Under such load conditions, damage to gears 34 and 36 shown in FIG. 2 is unlikely. However, in certain situations, such as when the vehicle is stuck or otherwise needs to obtain higher engine speeds, an override switch is provided. In some preferred embodiments, the higher engine speed may be 6500 rpm while in other embodiments it may be 7400 rpm. Such a predetermined limit may be defined in advance depending upon the engine and the application desired.

As seen in FIG. 3, a battery 44 is provided within ATV 10. Battery 44 is connected with a main key switch 46 that must be closed in order for the ignition to operate in engine 14. A four-wheel-drive switch 48 is also provided. If four-wheel-drive switch 48 is open, the vehicle operates in four-wheel-drive mode. In this embodiment, when four-wheel-drive switch 48 is closed, a two-wheel-drive relay 50 is engaged to keep the vehicle in two-wheel-drive. Thus, when four-wheel-drive switch 48 is closed, the two-wheel-drive relay is powered up to engage the switch with the upper-most connection shown in FIG. 3. Alternatively, the four-wheel-drive switch may be arranged to engage four-wheel-drive with switch 48 closed. In the two-wheel-drive switch position, a control box 52 allows the vehicle to operate in reverse at a limit of 4500 rpm. This is the standard reverse engine speed limit provided by control box 52. Control box 52 is the ignition control box that, in the preferred embodiment, includes a capacitor discharge ignition, but also provides engine speed limits based on pre-programmed parameters. Such control boxes are common in certain commercially available ATVs. However, the switching shown in FIG. 3 uses the control box with a specific reverse and override wiring as shown in FIG. 3 to accomplish the purposes of the present invention.

In embodiments having a manually operated reverse selector, an indicator switch is operated by the reverse selector. Such switch is also used in reverse operation to limit engine speed to a first level while in two-wheel-drive and a second level in four-wheel-drive with override selected.

An override switch 54 is also provided. A reverse switch 56 is shown in the closed position as this is the reverse override power flow diagram. If the vehicle is in two-wheel-drive by maintaining power to two-wheel-drive relay 50, either position of override switch 54 will send a signal to operate only under the reverse rev limit of 4500 rpm. However, if the two-wheel-drive relay is not powered up such that the switch allows four-wheel-drive operation, with the override switch pressed downwardly in FIG. 3, the rev limit switch within control box 52 goes to the "N" (neutral) position. Note that the vehicle is in reverse but the normal (neutral) rev limits are employed. The neutral position of the rev control switch allows a neutral rev limit of 6500 rpm in this particular embodiment. Thus, during reverse operation when four-wheel-drive is engaged, override switch 54 operates to allow a higher rpm for ATV 10. However, if only two-wheel-drive is engaged, override switch 54 is essentially non-functional. The electrical signal goes through relay 50 to the reverse rev limit, preferably 4500 rpm. Note that while the "neutral" rev limiter is used in the preferred embodiment for simplicity, a separate limiter could alternatively be wired in place for the reverse rev limit protection. Thus, in the current preferred embodiment the "neutral" rev limiter is used both when the transmission is in neutral and when in reverse without four-wheel-drive and the reverse override switch engaged. In the alternate embodiment other engine revolution speed limits than that imposed by the neutral limiter may be used.

Figure 4:
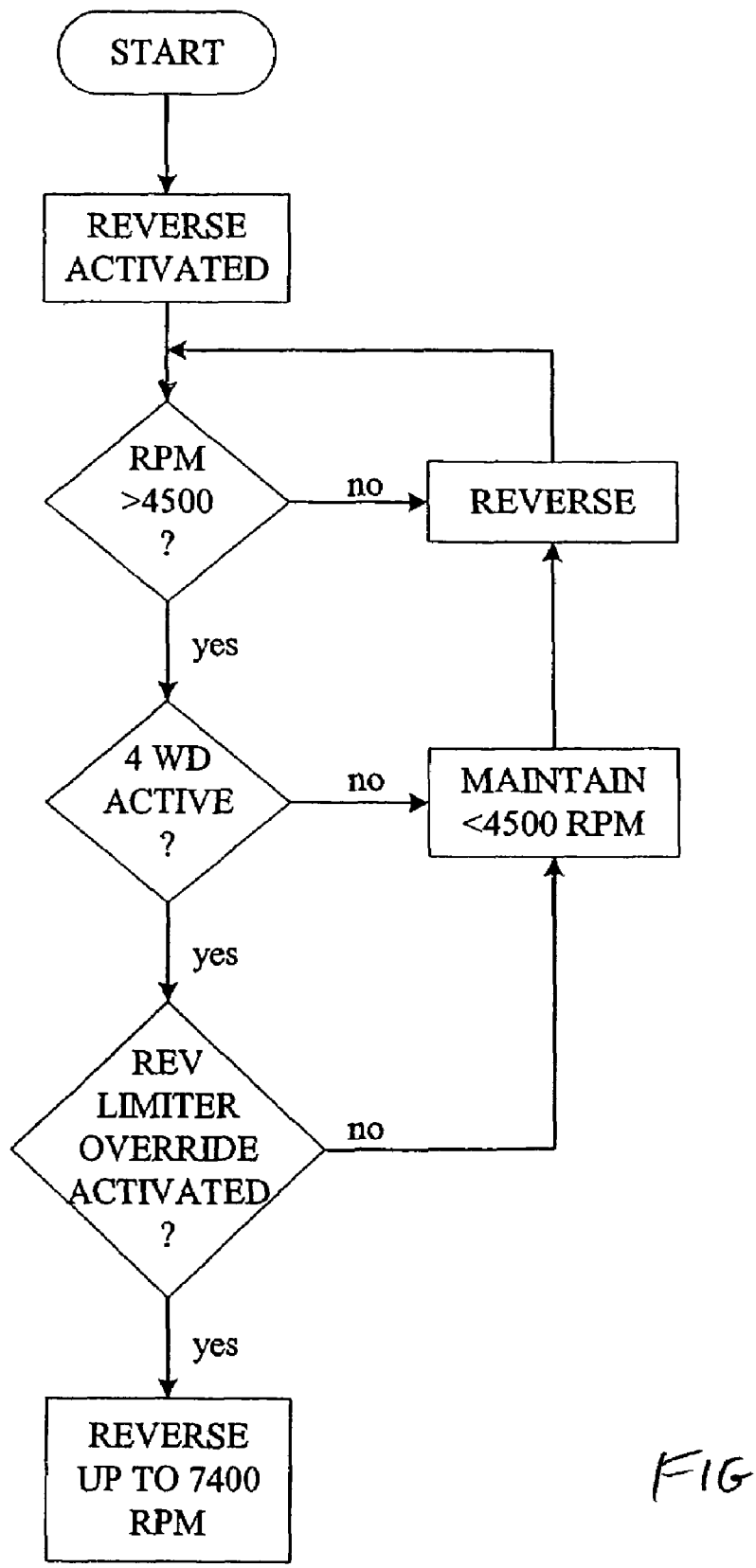
FIG. 4 is a flow chart describing the function of the wiring.

Thus, FIG. 3 illustrates a preferred embodiment of the present invention. The general concept can also be seen in FIG. 4. Beginning from the top of the flow chart in FIG. 4, the vehicle is started and run in reverse operation. If an attempt to operate the vehicle at a speed of higher than 4500 rpm, a first "gateway" is encountered requiring four-wheel-drive active in the system. The next gateway requires the override switch engaged. If four-wheel-drive is active and the rev limit override switch is activated, then reverse up to a higher predetermined level such as 6500 rpm as shown in FIG. 3 or 7400 rpm as shown in FIG. 4 can be obtained. If the rpm is less than 4500 rpm, then normal reverse operation is continued. If four-wheel-drive is not active, then the speed will be maintained at less than 4500 rpm through control box 52 that controls the ignition timing. If four-wheel-drive is active, but the rev limiter override is not activated, then the maintenance of the lower speed limit will also occur.

Figure 5:
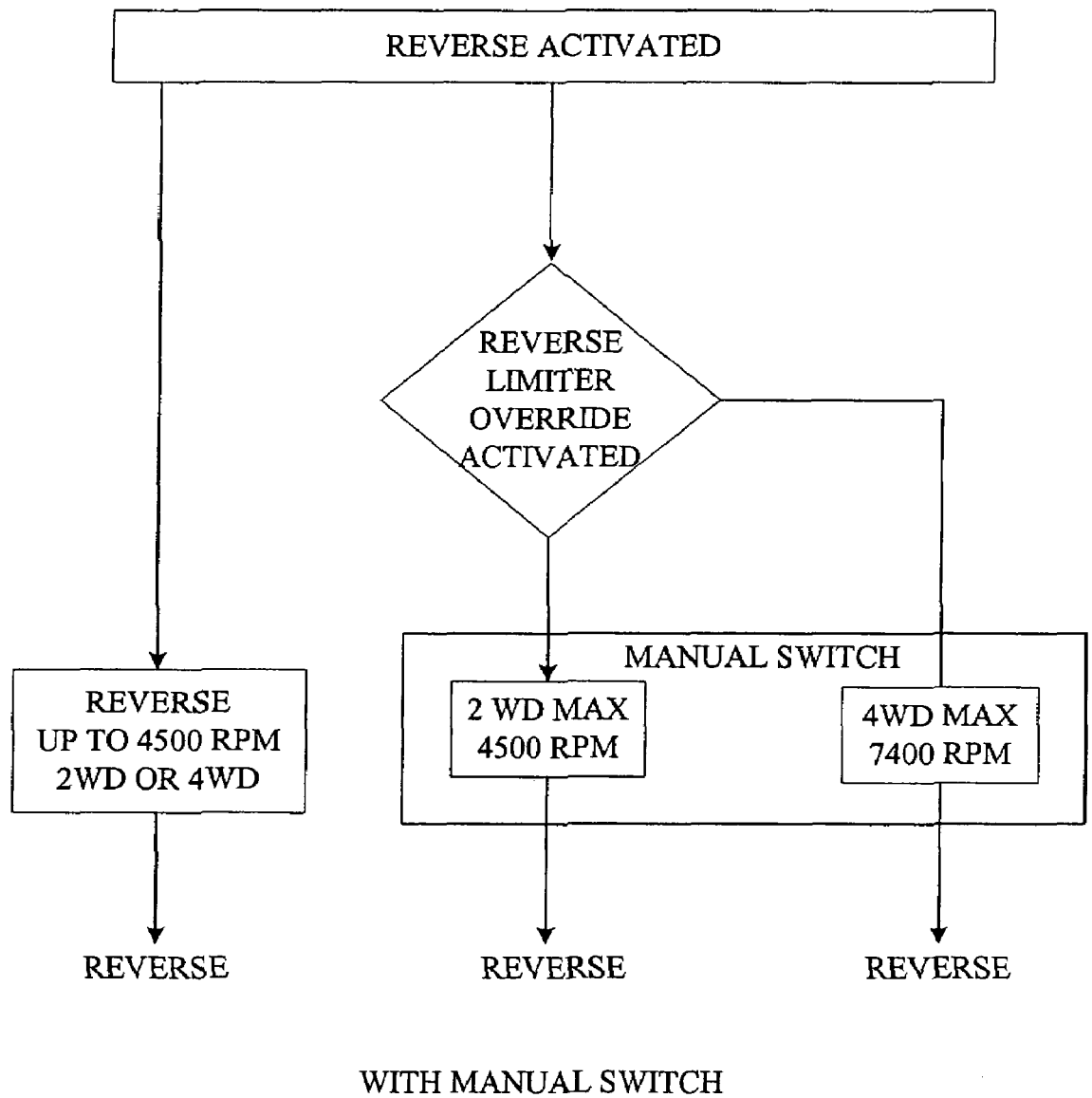
FIG. 5 is a flow chart describing the functions carried out with a manual reverse lever.

As illustrated in the flow chart of FIG. 5, normal reverse operation is allowed up to engine speeds of 4500 rpm in two- or four-wheel-drive. In reverse operation, with the rev limiter override activated reverse engine speeds are still maintained at 4500 rpm if the ATV is in two-wheel-drive. However, if the ATV is in four-wheel-drive, higher engine speeds are allowed. Note again with this embodiment that other preselected engine speed limits may be used.

Various modifications to the present system may be appreciated. For example, the system may automatically switch to four-wheel-drive operation (if not already there) when the override switch is engaged during reverse operation. Likewise, various signals could communicate to the operator to place the vehicle in four-wheel-drive in such situations. Other alternatives include rearrangements of the flow chart such that the rev limiter override activation gateway is presented before the question of whether the four-wheel-drive system is activated.

In all such instances, the system protects the right-angle gears in the engine from being destroyed when power is applied in high levels during reverse operation. The system employs a simple change in the wiring system of the vehicle rather than in expensive engine changes such as additional bearings. These high torque situations may well benefit in other ways four-wheel-drive engagement.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A reverse system for an ATV having an engine and an engine drive shaft, the system comprising:
   a reverse activator coupled to the drive shaft to activate operation of the ATV in a reverse direction;
   an engine speed limiter to limit engine speed to below a predetermined level while the reverse activator is activated;
   a four-wheel drive switch operable to place a transmission of the ATV in a four-wheel drive mode, the four-wheel drive switch located on the ATV for manual activation: and
   an override switch in electrical communication with the four-wheel drive switch to allow engine speeds above the predetermined level, the override switch being deactivated when the four wheel drive switch is other than in four-wheel drive mode.

2. The reverse system of claim 1, wherein the override switch also switches the ATV into four-wheel-drive.

3. The reverse system of claim 1, further comprising a selector and a front drive, the selector being coupled to the drive shaft and including an electric actuator to engage the drive shaft with the front drive.

4. The reverse system of claim 1, wherein the engine includes a crankshaft; and the system further includes a driven gear coupled to the drive shaft and a drive gear coupled to the crankshaft, the drive gear having a right-angle helical cut gear, wherein the drive shaft extends forward of the drive gear to drive front wheels of the ATV and rearward of the drive gear to drive rear wheels of the ATV.

5. The reverse system of claim 4, further comprising a selector and a front drive, the selector being coupled to the drive shaft and including a manual lever to engage the front drive shaft and front drive.

6. The reverse system of claim 4, further comprising a selector and a front drive, the selector being coupled to the drive shaft and including an electric motor to engage the drive shaft with the front drive.

7. The reverse system of claim 1, further comprising a four-wheel-drive switch to switch between two- and four-wheel-drive and a engine speed controller, wherein when the override switch is activated the position of the four-wheel-drive switch determines which setting is activated in the engine speed controller.

8. The reverse system of claim 7, wherein the engine speed controller includes a first, lower speed limit and a second, higher speed limit, the first speed limit being activated in reverse, two-wheel-drive.

9. A method for reverse operation of a vehicle comprising:
  engaging a reverse activator;
  limiting engine speed below a predetermined level in normal reverse operation;
  engaging an override switch to attempt reverse operation with engine speeds above the predetermined level;
  determining whether the vehicle is in a four-wheel-drive; and
  upon determination that the vehicle is in the four-wheel drive mode, activating the override switch to allow engine speeds above the predetermined level, the override switch being deactivated when the vehicle is not in four-wheel-drive mode.

10. The method of claim 9, wherein engagement of the override switch also ensures engagement four-wheel-drive.

11. The method of claim 10, wherein determining whether the vehicle is in the four-wheel-drive mode includes activating the override switch and controllably placing the vehicle in the four-wheel-drive mode.

12. The method of claim 11, wherein activating the override switch includes sending an electrical signal through a two-wheel/four-wheel-drive switch, wherein the two-wheel-drive switch transmits a signal to a controller to maintain a non-override engine speed condition.

13. A method of reversing a four-wheel-drive vehicle having an engine comprising:
  starting the engine;
  engaging reverse;
  maintaining engine speed below a predetermined level under normal reverse operation, regardless of operator throttle control input;
  determining whether the four-wheel-drive vehicle is in a four-wheel-drive mode;
  activating an override switch in electrical communication with a four-wheel-drive switch after determining that the vehicle is in the four-wheel-drive mode, the override switch being deactivated when the vehicle is not in four-wheel drive mode; and
  operating the engine in reverse at speed levels above the predetermined level while the vehicle remains in the four-wheel-drive mode.

14. The method of claim 13, wherein after the override switch is activated, four-wheel-drive is automatically engaged before reverse operation above the predetermined engine speed is allowed.

15. A reverse speed-limiter override circuit for a four-wheel-drive vehicle comprising:
  a power source;
  a two-/four-wheel-drive switch -coupled to the power source;
  a reverse switch;
  an actuatable override switch in electronic communication with the reverse switch and the two-/four-wheel-drive switch; and
  an engine speed limiter coupled to the drive switch and to the override switch, wherein when the override switch is in a first position a reverse operation engine speed is limited to a first level, and when the override switch is in a second position the reverse operation engine speed is operable above the first level, but only when a four-wheel-drive mode of the vehicle is engaged, the override switch being deactivated when the two-/four-wheel drive switch is other than switched to four-wheel-drive mode.

16. The circuit of claim 15, wherein the actuatable override switch in the first position sends an electric signal through the drive switch, the drive switch being coupled to the speed limiter such that the reverse operation engine speed is limited to the first level with the vehicle in a two-wheel-drive position, and wherein the actuatable override switch in the second position sends an electric signal through the drive switch such that the reverse operation engine speed is permitted above the first level only if the vehicle is in the four-wheel-drive mode.

17. The circuit of claim 15, wherein the two-/four-wheel-drive switch is an indicator switch coupled to a manual actuator.

\* \* \* \* \*

UNITED STATES PATENT AND TRADEMARK OFFICE
CERTIFICATE OF CORRECTION

PATENT NO. : 7,422,545 B2 Page 1 of 1
APPLICATION NO. : 11/119410
DATED : September 9, 2008
INVENTOR(S) : Macaluso et al.

It is certified that error appears in the above-identified patent and that said Letters Patent is hereby corrected as shown below:

In Claim 1, Line 29 the ":" should be ";"

In Claim 9, Line 7 the word "mode" should be added after "four-wheel-drive"

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,422,545 B2 | Page 1 of 1 |
| APPLICATION NO. | : 11/119410 | |
| DATED | : September 9, 2008 | |
| INVENTOR(S) | : Macaluso et al. | |

It is certified that error appears in the above-identified patent and that said Letters Patent is hereby corrected as shown below:

Column 6, In Claim 1, Line 29 the ":" should be ";"

Column 7, In Claim 9, Line 7 the word "mode" should be added after "four-wheel-drive"

This certificate supersedes the Certificate of Correction issued December 2, 2008.

Signed and Sealed this

Twenty-third Day of December, 2008

JON W. DUDAS
*Director of the United States Patent and Trademark Office*